United States Patent
Pervieux

[19]

[11] Patent Number: 5,998,754
[45] Date of Patent: Dec. 7, 1999

[54] FEEDING, SORTING AND GRADING SYSTEM FOR ELONGATE PRODUCE

[75] Inventor: Jacques Pervieux, Saint Etienne de Tulmont, France

[73] Assignee: Materiel Pour L'Arboriculture Fruitiere, Montauban, France

[21] Appl. No.: 08/894,309

[22] PCT Filed: Feb. 14, 1996

[86] PCT No.: PCT/FR96/00237

§ 371 Date: Aug. 14, 1997

§ 102(e) Date: Aug. 14, 1997

[87] PCT Pub. No.: WO96/26140

PCT Pub. Date: Aug. 29, 1996

[30] Foreign Application Priority Data

Feb. 21, 1995 [FR] France ................................... 95 02223

[51] Int. Cl.⁶ .............................. B65G 17/32; B07C 9/00; B07C 5/00
[52] U.S. Cl. ........................ 209/587; 209/698; 209/655; 209/922; 209/923; 209/939; 198/384
[58] Field of Search ............................ 198/384; 209/576, 209/577, 587 O, 656, 698 C, 665 C, 674, 676, 660, 922 C, 923 C, 939 C

[56] References Cited

U.S. PATENT DOCUMENTS

| | | |
|---|---|---|
| 1,337,257 | 4/1920 | O'Quinn . |
| 3,300,021 | 1/1967 | Holmes ....................................... 198/33 |
| 4,033,450 | 7/1977 | Paddock et al. . |
| 4,348,277 | 9/1982 | Cowlin et al. ............................ 209/705 |
| 5,143,226 | 9/1992 | Walton ..................................... 209/624 |

FOREIGN PATENT DOCUMENTS

| | | |
|---|---|---|
| 0 185 424 | 6/1986 | European Pat. Off. . |
| 0 340 164 | 11/1989 | European Pat. Off. . |
| 0 491 407 | 6/1992 | European Pat. Off. . |
| 0 553 933 | 8/1993 | European Pat. Off. . |
| 1.445.604 | 7/1966 | France . |
| 2 412 481 | 7/1979 | France . |
| 1 276 361 | 6/1972 | United Kingdom . |
| 1 348 570 | 3/1974 | United Kingdom . |
| 1 593 149 | 7/1981 | United Kingdom . |

*Primary Examiner*—William E. Terrell
*Assistant Examiner*—Kenneth W. Bower
*Attorney, Agent, or Firm*—Young & Thompson

[57] ABSTRACT

A feed device for a unit for sorting elongate items, particularly vegetables such as carrots, includes a slanted conveyor (23) with a plurality of freely rotatable transverse rollers (24) driven by two endless chains. The conveyor includes three longitudinal sections, i.e. a lower section (23a) having a device (30) for rotating the rollers (24) in the same direction as the forward direction of the conveyor (23), an intermediate section (23b) where the rollers (24) are freely rotatable, and an upper section (23c) having an element (33) for rotating the rollers (24) in the opposite direction to the forward direction of the conveyor. A unit for sorting elongate items is also disclosed.

24 Claims, 10 Drawing Sheets

FEEDING, SORTING AND GRADING SYSTEM FOR ELONGATE PRODUCE

FIELD OF THE INVENTION

The invention relates to a feeding device for a unit for sorting elongate produce, in particular vegetables such as carrots. It also relates to a sorting unit comprising such a feeding device as well as to a distribution device and to a grading device fitted to this sorting unit.

BACKGROUND OF THE INVENTION

The grading operations of fruit or vegetables requires that these latter be individualized in order for them to be analyzed optically. This operation has proved to be difficult when such fruit or vegetables consist of elongate produce, such as for example carrots, owing to the fact that the feeding of the graders requires an assembly line of the produce starting from a shipment of products delivered in bulk.

Such an assembly line requires in fact the arrangement of the produce with a constant flow in parallel rows, so as to ensure a good yield by the grader, in each of which rows the items of produce are sufficiently widely spaced to allow their individual optical analysis.

OBJECTS OF THE INVENTION

At present, there does not exist a feeding device enabling the grader to be fed under optimal conditions of yield and reliability and the objective of the present invention is to make good this deficiency by providing a feeding device capable of dividing a stream of elongate produce into a number of parallel rows in each of which the produce are arranged one after another.

Another objective of the invention is to provide a sorting unit for elongate produce possessing optimal rate and reliability.

SUMMARY OF THE INVENTION

For this purpose the invention relates in the first instance to a feeding device for a sorting unit for elongate produce, in particular vegetables such as carrots, suitable for arranging a shipment of such produce delivered in bulk in parallel rows in each of which the items of produce are aligned one after the other, the feeding device being characterized in that it comprises an inclined conveyor extending in an ascending slope, comprising a number of transverse rollers each freely rotatable round a transverse axis borne near its ends by two longitudinal endless chains driven synchronously and spaced so that two successive rollers define between them a receptacle for an item of produce, the conveyor comprising longitudinally starting from its low end at which produce is fed in:

a first lower longitudinal section including machinery for rotating the rollers around their axis in the same sense of rotation as the forward direction of the conveyor, a second intermediate longitudinal section along the length of which the rollers are free to rotate, and a third upper longitudinal section including machinery for rotating the rollers around their axis in the opposite direction to the forward direction of the conveyor.

According to this device the produce is first made to ascend the length of the lower longitudinal section as a result of the rotation of the rollers in the same direction of rotation as the forward direction of the conveyor. After an intermediate transfer zone the produce then reaches the level of the upper longitudinal section along the length of which the rotation of the rollers in the opposite direction to the forward direction of the conveyor causes firstly rejection towards the lower longitudinal section of the produce incorrectly placed between two rollers and, secondly, a separation of the produce possibly overlapping or superposed between the rollers.

In practice, such a device makes it possible to arrange the items of produce one after another between successive rollers with a high feeding rate and with 100% filling rate of the conveyor. As an example, with produce such as carrots, the rate of forward movement of a conveyor in conformity with the invention may attain approximately one m/s.

In accordance with another characteristic of the invention, the intermediate section of the conveyor includes a friction wheel aligned so as to present a tangential contact with the lower generator of the rollers, the friction wheel being made to rotate by the machinery causing the upper section of the conveyor to rotate.

The presence of this friction wheel has the advantage of stopping the rotation of the rollers conferred by the machinery causing the rotation of the lower longitudinal section and of reversing this rotation before the rollers reach the straight part of the upper longitudinal section.

In accordance with another characteristic of the invention, the axis of each roller includes near one of its ends at least one toothed wheel, the machinery for rotating the rollers consisting of a fixed chain at right angles to the lower section and, at right angles to the upper section, of a longitudinal endless chain driven at a rate appreciably higher than that of the conveyor, the chains extending at a slope identical with that of the conveyor and being arranged to mesh with the toothed wheels of the rollers.

Furthermore, the feeding device advantageously features lateral guidance elements for the toothed wheels of the axes of the rollers suitable for maintaining the wheels along a rectilinear trajectory.

Moreover, each chain drive for the rotation of the wheels preferentially possesses an initial lower section extending at a slope with an inclination substantially higher than that of the conveyor.

Such an initial inclination makes it possible to obtain a progressive meshing of the toothed wheels which eliminates any risk of damage to these latter.

The invention also relates to a sorting unit for elongate produce, in particular vegetables such as carrots, comprising, in addition to a feeding device such as that described above:

a distribution device for the produce comprising a conveyor possessing a loading zone arranged plumb with the upper end of the feeding device and a distribution zone extending horizontally, the conveyor featuring:

a number of inclined transverse flaps each of which is capable of swivelling around a transversal axis borne near its ends by two longitudinal endless chains driven synchronously, the flaps being arranged so that two successive flaps between them define a receptacle of variable width depending on their inclination to each other, machinery for tilting the flaps adapted, on the one hand, to arrange them at an inclination defining a minimal receptacle width, at right angles to the loading zone, adapted in order to make it possible to receive all of the produce delivered by the feeding device and, on the other, to cause the tilting of the flaps so as to confer on them an inclination suitable for the unloading of the produce borne by the latter at right angles to the unloading zones, a grading device equipped with means for optical analysis and a number of parallel transport lines including transfer machinery equipped with an initial loading section for the produce arranged plumb with an unloading zone of the distribution device.

This sorting unit thus contains a distribution device which ensures the transfer of the rows of produce arranged by the feeding device to a grading device thus making it possible to feed this latter at a rate identical with that of the feeding device.

In accordance with another characteristic of the invention relating to the distribution device:

each flap of the said distribution device is equipped at right angles to at least one of its ends with a castor with a horizontal axis of rotation parallel to the swivel axis of the flaps, the machinery for tilting includes at least one horizontal longitudinal track, arranged to constitute a rolling surface for the castors, each of the tracks being equipped with at least one interruption of the rolling surface at right angles to an unloading zone, suitable for leading to a tilting of the flaps.

Furthermore, the machinery for transfer of the produce advantageously comprises for each transport line, two parallel transporting bands driven synchronously, arranged with respect to each other so as to define transversally a V-shaped channel capable of accommodating and transporting a row of produce.

This transfer machinery is, in addition, preferentially divided longitudinally into two sections aligned such that one is the extension of the other: a first section incorporating the initial loading section, the two transporting bands of which are driven synchronously at a rate lower than that of the grading device, and a terminal section, the two transporting bands of which are driven at a rate equal to that of the grading device.

This arrangement has the advantage of making it possible to increase the distance separating the items of produce before these latter reach the grading device.

Moreover, in accordance with another characteristic of the invention, the machinery for tilting the flaps of the distribution device are adapted to cause successively:

an initial tilting suitable for separating the flaps by a predefined distance capable of causing the removal of the produce having transversal dimensions smaller than a given lower value of grading, at least one additional tilting capable of making possible the unloading of the produce of transverse dimensions included between the given upper and lower grading values, a final additional tilting suitable for the removal of all of the produce not unloaded along the length of the conveyor of the distribution device.

Such a distribution device makes it possible to perform an initial sorting leading to the systematic removal of the produce the size of which is greater or smaller than the given grading values.

In accordance with another characteristic of the invention, the sorting unit comprises:

a first feeding device such as that described above, a first distribution device adapted to remove the produce of dimensions smaller than the lower grading value and greater than the higher grading value, respectively, and to unload alternatively a number of rows of produce at right angles to two successive unloading zones, two parallel secondary feeding and distribution assemblies extending at right angles with respect to the first distribution device, each arranged to be fed by produce delivered at right angles to one of the unloading zones of the first distribution device, each of the assemblies successively comprising a feeding device and a distribution device, the distribution device of one of the assemblies being adapted to possess an unloading zone suitable for the simultaneous unloading of a number n of rows of produce plumb with n lines of transport driven by the transfer machinery for the grading device, the distribution device of the other assembly being longer than that of the first assembly and being adapted to possess an unloading zone able to make it possible to unload a number m of rows of produce plumb with m lines of transport driven by the transfer machinery for the grading device parallel to the n lines of transport previously mentioned.

Such a unit offers the advantage of its being able to operate at a very high rate. In fact, the presence of the two secondary feeding and distribution assemblies enables a large number of transport lines to be fed simultaneously. As an example, such a sorting unit may comprise a grading device serving a dozen parallel transport lines.

Furthermore, the grading device preferentially comprises a conveyor featuring:

a number of parallel and transverse conveyor pins attached to supports borne by longitudinal endless chains arranged so that a longitudinal series of conveyor pins extends along each transport line of the transfer machinery, the pins being fitted with a locking mechanism able to maintain them in a conveyor position in which an item of produce is borne by a given number of successive pins, triggering machinery for the locking mechanism for the conveyor pins adapted to cause the selective tilting of a given number of pins for the purpose of unloading the produce borne by the latter in the unloading zones.

Furthermore, in accordance with another characteristic of the invention relating to this grading device:

each conveyor pin is prolonged by a body containing an aperture having an oblong shape with a vertical main axis accommodating an articulation axis forming an integral part of a support suitable for making possible a clearance of the pin in a vertical direction, the body featuring transversely a convex frontal lower face in which is provided a lower slot suitable for accommodating in the conveyance position a spur forming an integral part of the support and an ejector lug extending the body downwards and arranged opposite to the convex lower face with respect to the slot, the triggering machinery comprises a cam associated with a swivelling mechanism suitable for making it tilt around a longitudinal axis between an active position in which it is on a trajectory of the spurs of the conveyor pins and causes an upward displacement of the lugs and an initial tilting of the pins and a passive position where the cam allows the passage of the lugs.

Such a design makes it possible to obtain a very convenient triggering of the conveyor pins, the tilting of these latter, once the locking has been initiated by a cam, being produced by the weight of the produce borne by the locking pins.

In addition, each conveyor pin advantageously comprises a buffer made of a compressible material housed in an oblong aperture, adapted to serve as elastic means suitable for maintaining the conveyor pins locked.

The invention also relates to a distribution device comprising a conveyor having a loading zone and a distribution zone extending horizontally characterized in that the said conveyor comprises:

- a number of inclined transverse flaps each able to swivel around a transverse axis borne, at its ends, by two longitudinal endless chains driven synchronously, the flaps being arranged so that two successive flaps define between them a receptacle of a width varying as a function of their respective inclination,
- tilting machinery for the flaps adapted, on the one hand, so as to dispose them at an inclination defining a minimal accommodating width, at right angles to the loading zone and, on the other, to cause the tilting of the flaps so as to confer on them an inclination suitable for the unloading of the produce borne by the latter at right angles to the unloading zones.

The invention finally relates to a grading device comprising means for optical analysis and a conveyor equipped with a number of parallel transport lines, the grading device being characterized in that the conveyor comprises:

- a number of parallel and transverse conveyor pins, attached to supports borne by longitudinal endless chains, the pins being equipped with a locking mechanism able to maintain them in a conveyance position in which an item of produce is borne by a given number of successive pins,
- triggering machinery for the locking mechanism for the conveyor pins adapted to cause the selective tilting of a given number of pins in order to unload the produce borne by the latter in unloading zones.

BRIEF DESCRIPTION OF THE DRAWINGS

Other characteristics, objectives and advantages of the invention will become apparent from the detailed description which follows with reference to the appended diagrams which present a preferred embodiment as a non-limiting example. In these diagrams which form an integral part of the present description.

DETAILED DESCRIPTION OF THE INVENTION

Figure 1:
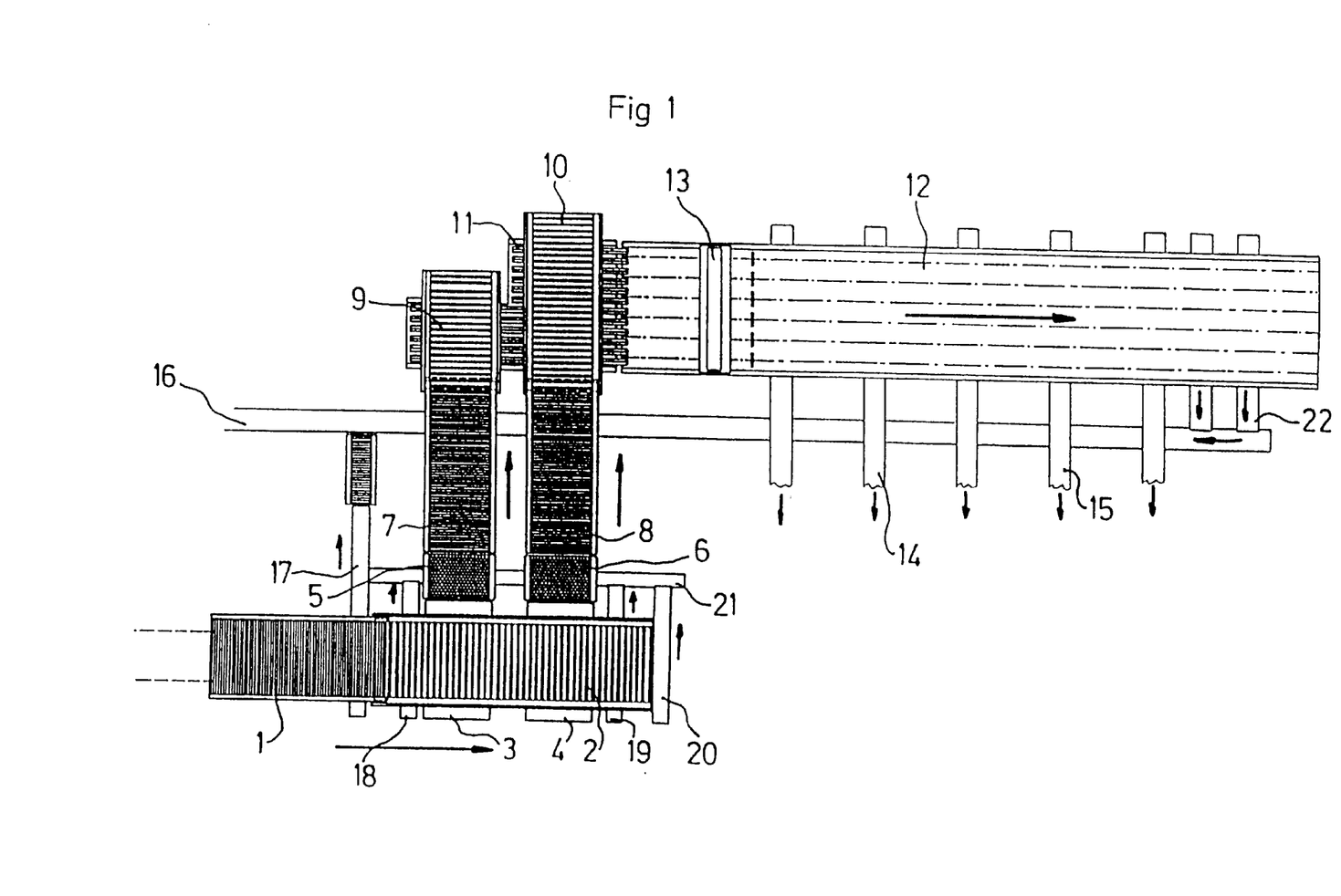
FIG. 1 is a schematic plan view of a sorting unit in conformity with the invention.

The sorting unit shown in FIG. 1 is particularly suited to perform the sorting of vegetables such as carrots as a function of predefined selection criteria linked to the diameter, the length, the colour, the curvature, etc . . . of these vegetables.

This sorting unit comprises three principal stations:

- a first station comprising a feeding device 1 suitable for arranging a shipment of the carrots delivered in bulk in parallel rows and a distribution device 2 designed in particular to remove the carrots having diameters smaller and larger, respectively, than given sizes and to deliver the carrots not removed at right angles to two unloading zones:
- a second station comprising two parallel secondary feeding and distribution assemblies extending at right angles with respect to the distribution device 2 of the first station and each comprising a loading section situated plumb with the distribution device, the secondary assemblies being suited to feed simultaneously twelve transport lines and each comprising successively:
  - a conveyor belt 3, 4 equipped with an initial loading section arranged plumb with an unloading zone of the distribution device 2 of the first station,
  - a grid conveyor 5, 6 suitable for the removal of pieces of carrot,
  - a feeding device 7, 8 suitable for re-arranging the carrots in parallel rows,
  - and a distribution device 9, 10 designed to make possible the simultaneous unloading of six rows of carrots plumb with six parallel transport lines, the distribution devices being arranged so that their unloading zones are longitudinally displaced so as to feed twelve transport lines,
- a third station comprising transfer machinery 11 equipped with initial loading sections situated respectively plumb with the distribution devices 9, 10 of the second station and a grading device 12 with twelve transport lines equipped with means for optical analysis 13 of any known type such as camera, . . . , and conveyor belts such as 14, 15 for removal of the graded produce.

In addition, this sorting unit comprises in the standard manner means for waste disposal able to deliver the waste towards a waste collector 16 and comprising principally: a waste disposal belt 17 arranged plumb with the feeding device 1 of the first station, arranged to make it possible to carry away the produce retrieved manually, three waste disposal belts 18–20 arranged plumb with the distribution device 2 of the first station, a waste disposal belt 21 situated plumb with the grid conveyors 5, 6 and a waste disposal belt 22 situated plumb with the end of the grading device 12.

Figure 2:
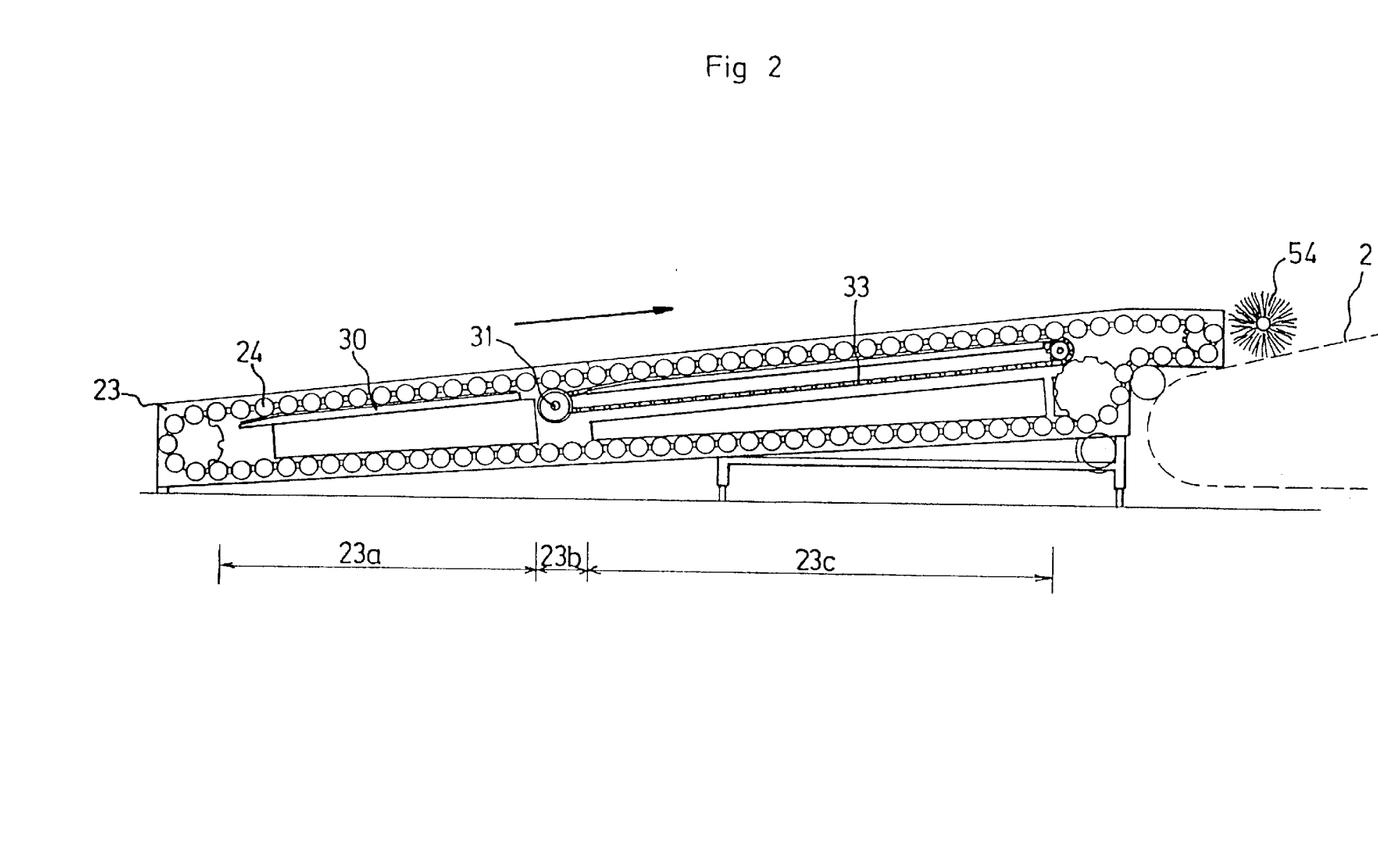
FIG. 2 is a schematic longitudinal section of a feeding device in conformity with the invention.

In the first place, the respective feeding devices 1, 7, 8 of the first and second stations are of identical design and comprise a conveyor 23 extending in an upwardly inclined slope at an angle between approximately fifteen and twenty five degrees.

This conveyor 23 comprises a number of transverse rollers like 24 mounted in free rotation around transverse axes such as 25 each borne, towards their ends, by two longitudinal endless chains such as 26 driven synchronously, the rollers being spaced so that two successive rollers define a space suitable for accommodating a row of carrots.

Figure 5:
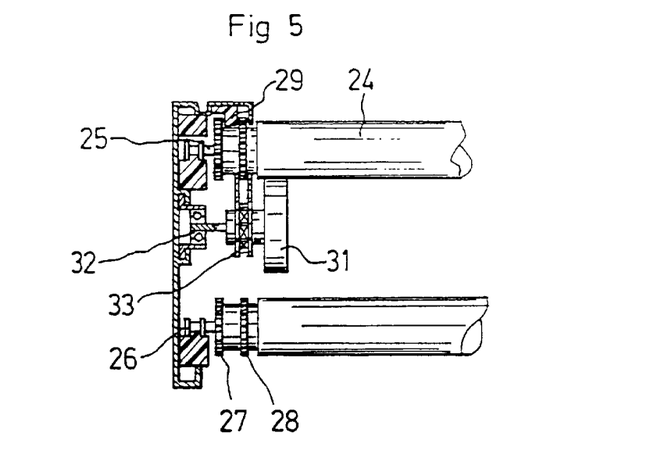
FIG. 5 is a scaled-up partial transverse section through a plane A.

Each of the rollers 24 comprises in addition near one of its ends two separated, toothed wheels 27, 28 between which are accommodated lateral guidance organs fixed such as 29 suitable for maintaining the toothed wheels along a straight trajectory. It should be noted that the only reason for the interior toothed wheel 28 is to define a groove with the end of the rollers in which is accommodated a return cover designed to avoid the carrots getting stuck laterally.

Figure 3:
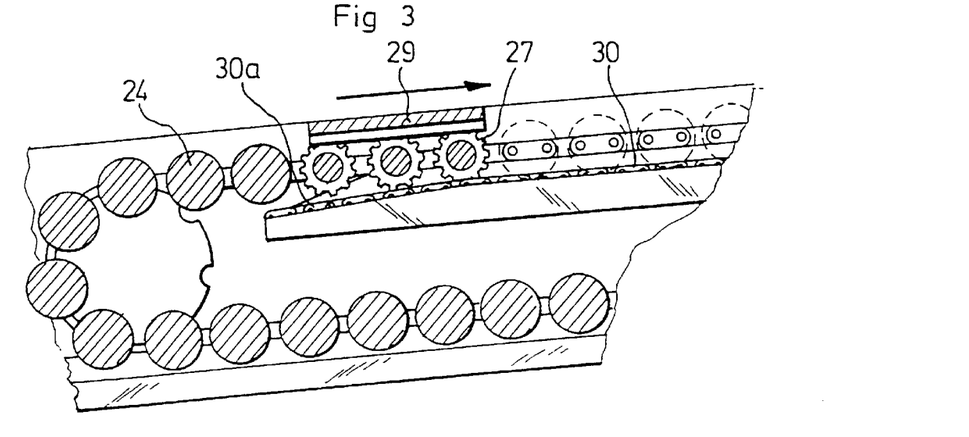
FIG. 3 is a scaled-up partial longitudinal section of the lower longitudinal section of this feeding device.
Figure 4:
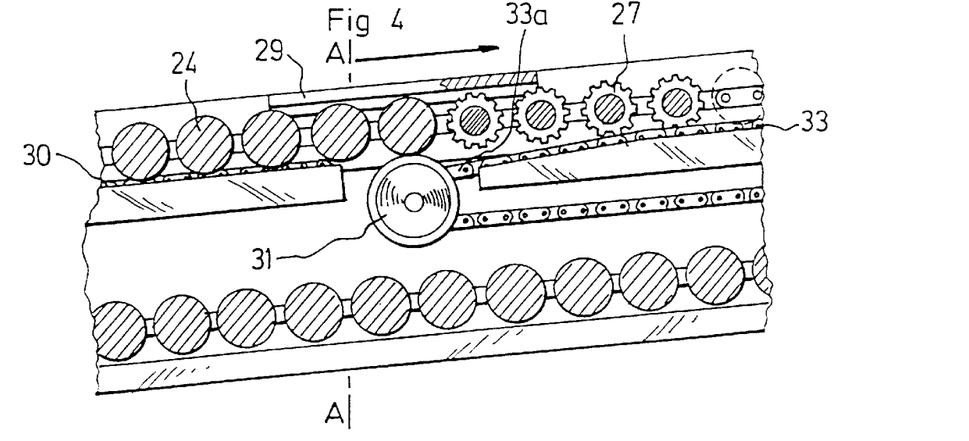
FIG. 4 is a scaled-up partial longitudinal section of the upper and intermediate longitudinal sections of this feeding device.

Moreover, starting from its low end at which produce is fed in, the conveyor 23 comprises longitudinally three separate sections:

a first lower longitudinal section 23a comprising machinery for rotating the rollers 24 in the same direction of rotation as the forward direction of the conveyor 23. This machinery for rotation comprises a fixed longitudinal chain 30 arranged to mesh with one of the toothed wheels 27 of the rollers 24. This fixed chain 30 comprises in addition an initial section 30a extending in a slope substantially greater than that of the conveyor 23 so as to progressively "get a grip" on the toothed wheels 27, a second intermediate longitudinal section 23b with inversion of the direction of rotation of the rollers 24, including a friction wheel 31 arranged so as to have a tangential contact with the lower generator for the rollers, the friction wheel being borne by a transverse axis mounted on a bearing/and made to rotate with a direction of rotation opposite to that of the conveyor 23, a third longitudinal section 23c comprising machinery for rotating the rollers 24 with a direction of rotation opposite to that of the conveyor 23, adapted also to cause the friction wheel 31 to rotate. This machinery of rotation comprises a longitudinal endless chain 33, adapted to mesh with the toothed wheel 27 of the rollers 24. This chain 33 comprises in addition an initial section 33a having an inclination substantially greater than that of the conveyor 23.

Furthermore, this chain 33 is driven at a speed slightly higher than that of the forward movement of the conveyor 23.

As indicated above such a conveyor 23 makes it possible to arrange the produce between the rollers 24 such that these latter are aligned one after the other in parallel rows.

Figure 6:
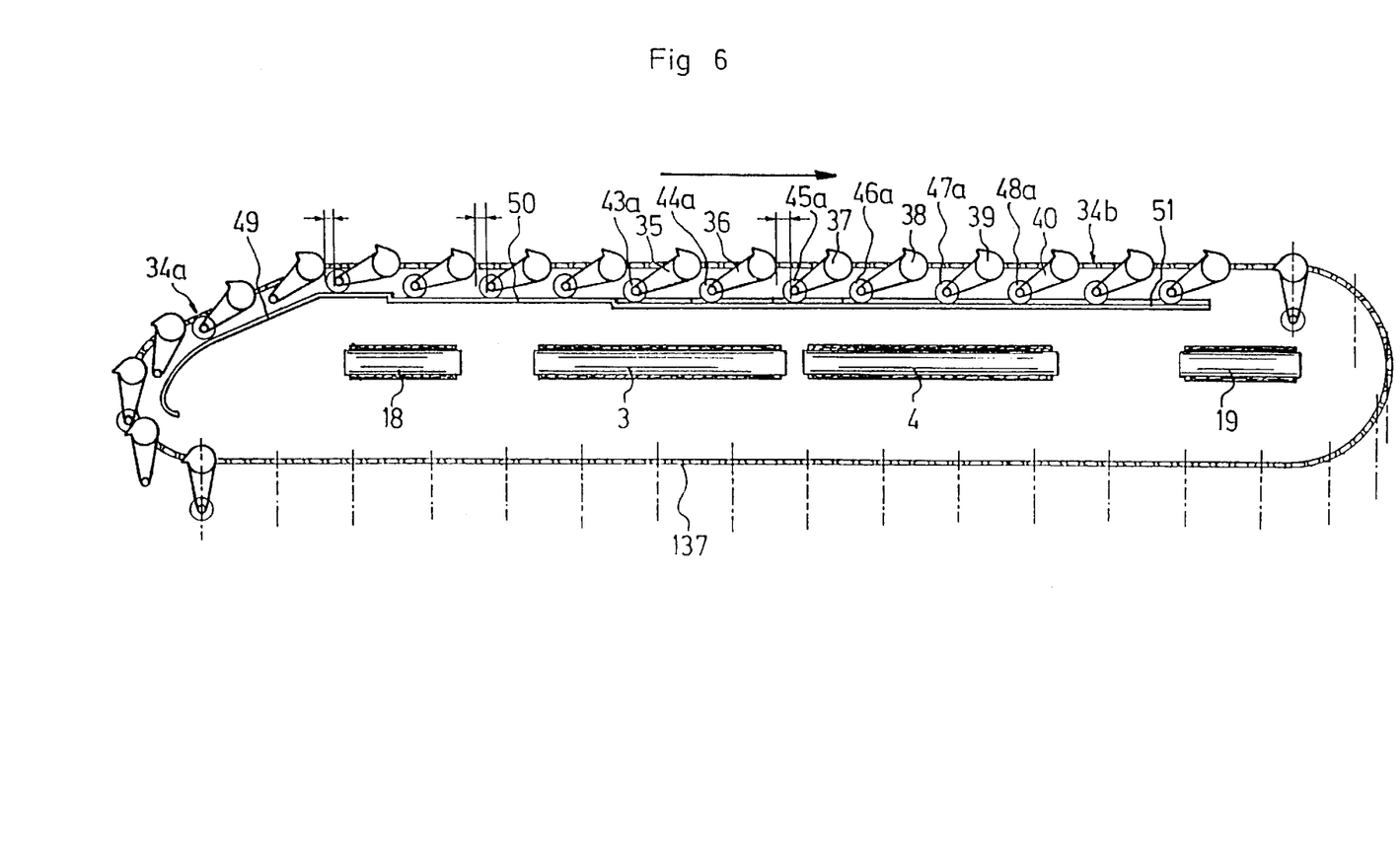
FIG. 6 is a schematic longitudinal section of a distribution device in conformity with the invention.

In the second place, the respective distribution devices 2, 9, 10 of the first and second stations are similar in principle, the difference between the distribution devices lying in the distribution of the unloading zones of these latter.

All these distribution devices comprise a conveyor 34 possessing an inclined loading zone 34a arranged to be plumb with the corresponding feeding devices 1, 7, 8 and a horizontal distribution zone 34b.

This conveyor 34 comprises several inclined transverse flaps 35, 36, 37, 38, 39, 40 able to swivel around transverse axes each borne near their ends by two longitudinal endless chains such as 137 driven synchronously, the flaps being arranged so that two successive flaps define between them a groove of width varying as a function of their respective inclination.

Each of these flaps 35–40 is constituted transversally of a V-shaped profile 41 opening in the direction of the axis of rotation, closed off at its base by a hollow tube 42 of diameter greater than the length of the base. This hollow tube 42 accommodates in addition at each of its ends a cap (not shown) able to swivel relative to the swivel axis. Furthermore, this hollow tube 42 comprises a longitudinal spur 42a arranged so as to protrude with respect to the upper face of the profile 41 and adapted to prevent the produce from "jumping" between two rows of flaps 35–40 during the feeding of the distribution device 2, 9, 10.

These distribution devices comprise in addition machinery for tilting the flaps 35–40 adapted, on the one hand, to arrange them at an inclination defining a groove of minimal width at right angles to the loading zone 34a of the conveyor 34 and, on the other hand, to cause the tilting of the flaps at right angles to the unloading zones.

This machinery for tilting comprises in the first instance, two castors for each flap 35–40 such as 43a, 43b, 44a, 44b, 45a, 45b, 46a, 46b, 47a, 47b, 48a, 48b with horizontal axes of rotation parallel to the swivel axis, displaced laterally with respect to the flaps by a defined distance variable from one flap to another as explained below. For this purpose each of these castors 43–48 is borne by an axis extending transversally in the prolongation of the lower end of the profile 41 of the flaps 35–40.

The tilting machinery comprises, in addition, horizontal longitudinal tracks 49–53 arranged to constitute rolling surfaces for the castors 43–48, each of the tracks being equipped with zones of interruption of the rolling surface suitable for leading to a tilting of the flaps 35–40.

Figure 7:
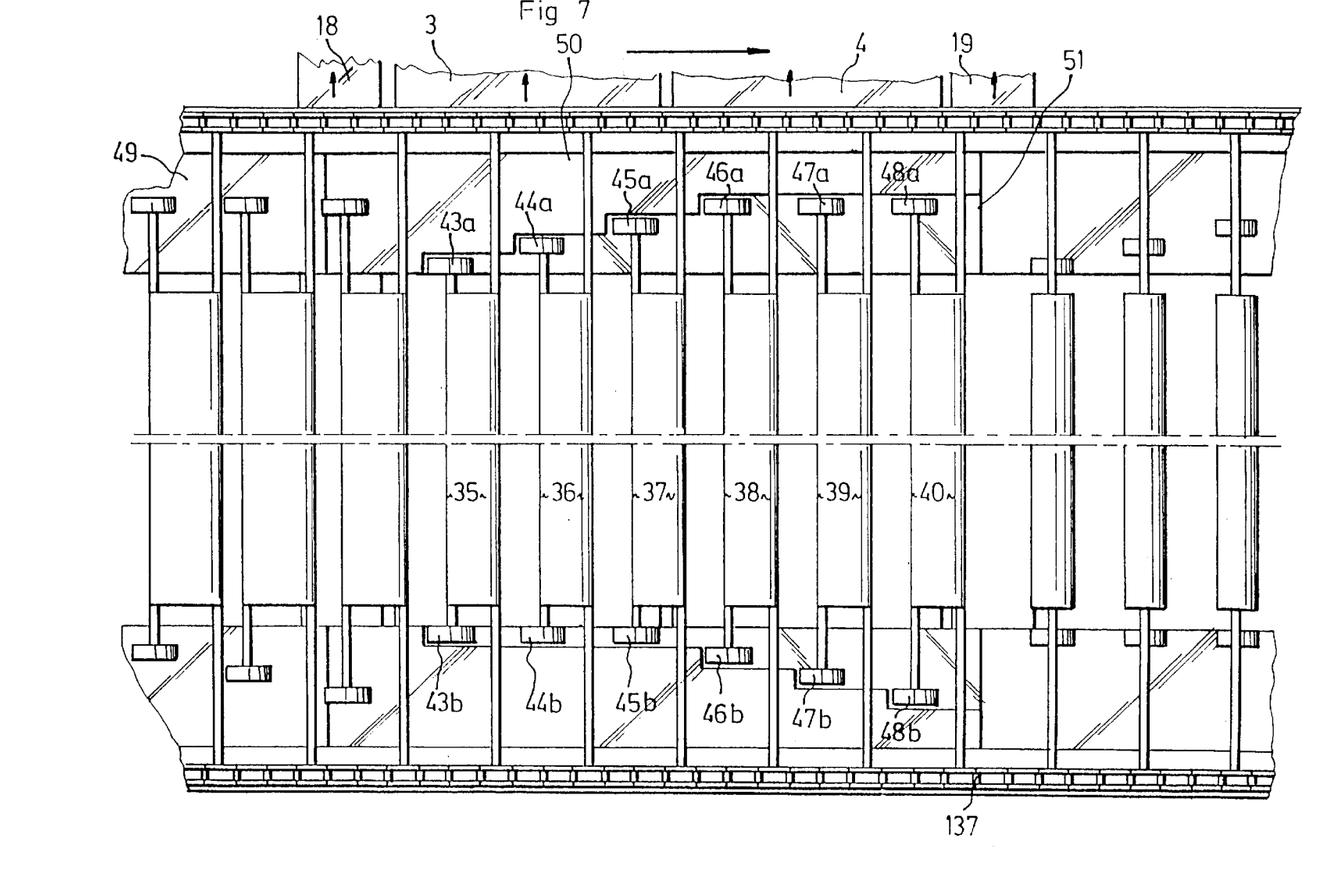
FIG. 7 is a schematic partial top view of the first distribution device of the sorting unit.
Figure 8:
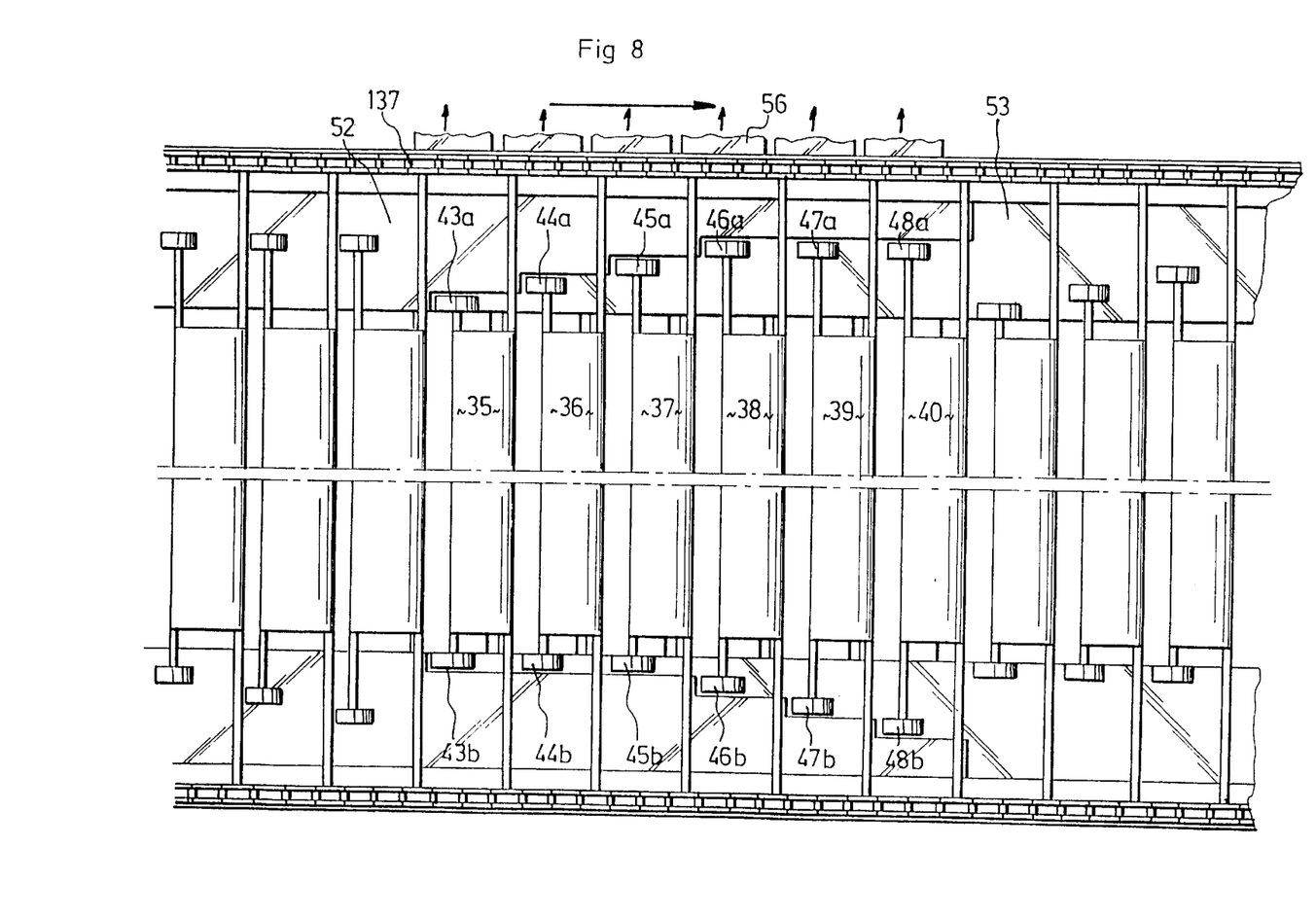
FIG. 8 is a schematic partial top view of the distribution device of one of the secondary feeding and distribution assemblies of the sorting unit.
Figure 9:
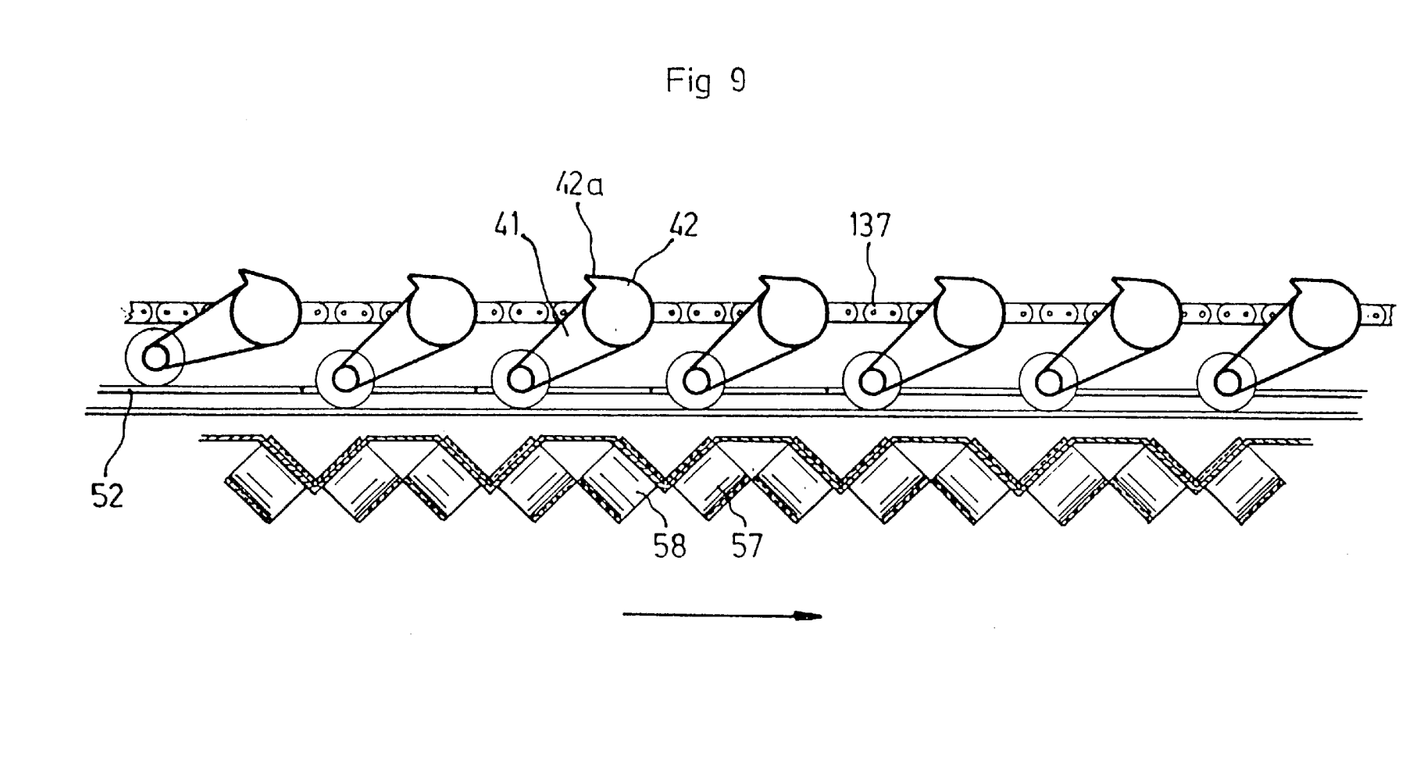
FIG. 9 is a scaled-up partial longitudinal section of this distribution device, also presenting the machinery for the transfer of the produce towards the grading device.

As shown in the FIGS. 7 and 8, the distribution devices 2, 9, 10 comprise successively identical series of six flaps 35–40, the flaps of each of these series differing from one another by the arrangement of the castors 43–48 associated with these latter.

Thus each of these series comprises three first flaps 35–37 equipped at one of their ends with castors 43a, 44a, 45a displaced laterally with respect to each other, and at their other end with three castors 43b, 44b, 45b aligned longitudinally and separated by a distance "a" from the end of flap.

Each series of flaps comprises in addition three other flaps 38–40, equipped at one of their ends with three castors 46a, 47a, 48a aligned longitudinally and separated by a distance "b" greater than "a" from the end of the flap and at their other end with three castors 46b, 47b, 48b displaced laterally with respect to each other.

Furthermore, as shown in FIG. 7, the tracks of the distribution device 2 of the first station are three in number displaced vertically:

a first upper track 49 extending at the loading zone 34a and discontinued plumb with the removal belt 18 adapted to cause a tilting of all of the flaps 35–40 making it possible to remove all the produce having a diameter smaller than a given size, a second intermediate track 50 equipped with narrowings interrupting the rolling surface suitable for causing the tilting of three flaps 35–37 at right angles to a conveyor belt 3 and simultaneously the tilting of three other flaps 38–40 at right angles to the other conveyor belt 4, a third lower track 51 discontinued plumb with the removal belt 19, adapted to cause a total tilting of all of the flaps 35–40.

As an example, the tilting machinery for this first distribution device 2 makes it possible to remove the carrots having a diameter less than 22 mm or greater than 45 mm.

As shown in FIG. 8, the distribution devices 9, 10 comprise an upper track 52 equipped with narrowings interrupting the rolling surface of the castors 43–48 suitable for causing the simultaneous tilting of six flaps 35–40 at right angles to six transport lines and a lower track 53 suitable for preventing inopportune rebounds of the flaps.

Finally, the distribution devices 9, 10 comprise a brush roller 54, shown in FIG. 2, interposed between the loading zone 34a of the conveyor 34 and the upper end of the feeding devices 1, 7 and 8 and made to rotate synchronously with the endless chains 137, in a direction of rotation opposite to the forward direction of the conveyor 34. The purpose of such a brush roller 54 is to prevent rebounds of the produce and to ensure perfect synchronization.

Figure 10:
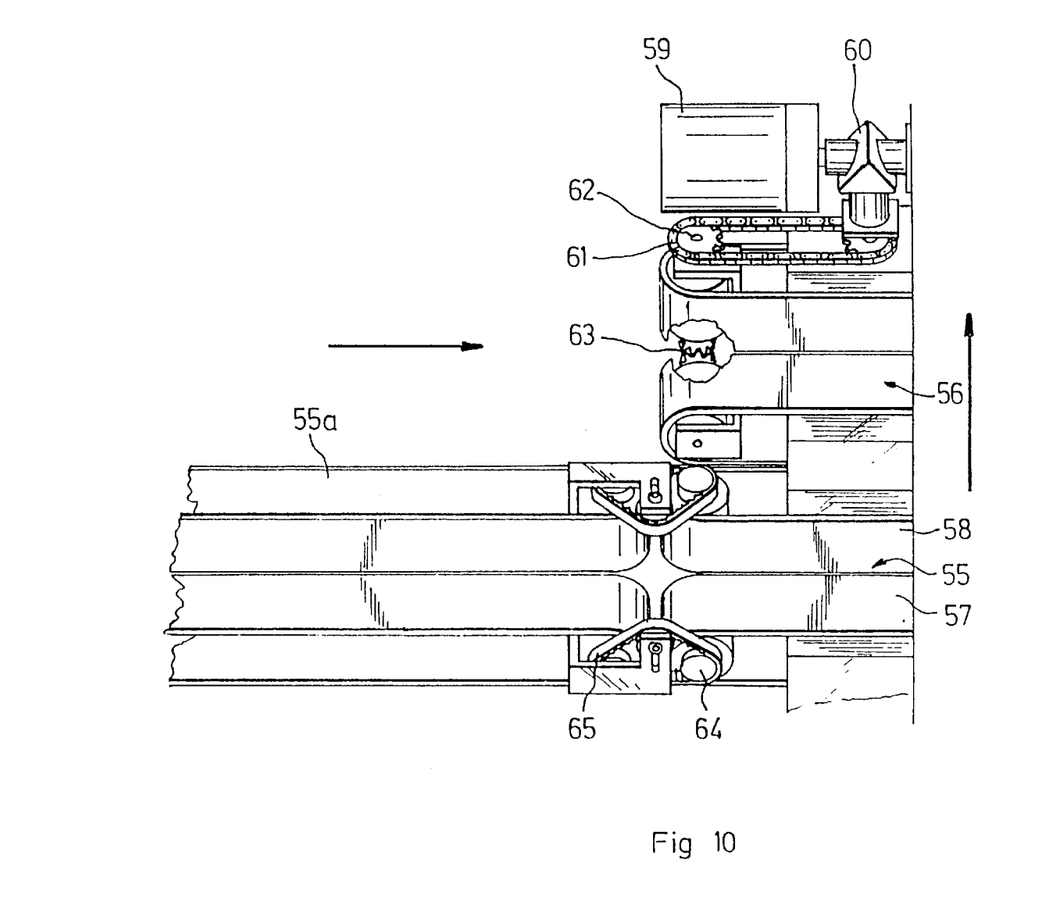
FIG. 10 is a partial top view of this transfer machinery.

The transfer machinery comprises twelve transport lines such as 55, 56 each arranged to receive a row of produce distributed by the devices 9, 10. In addition, six of these transport lines such as 55 have an initial section 55a adapted to be plumb with the distribution device 9, whereas the six other transport lines such as 56 are interrupted at right angles to the other distribution device 10.

Each of these transport lines 55, 56 comprises two parallel conveyor belts 57, 58 driven synchronously, arranged relative to each other so as to define transversally a V-shaped groove able to accommodate and transport the produce.

The machinery for driving these transport lines 55, 56 comprises a geared motor 59 and a transmission system including a bevel gear 60 and a chain 61/toothed wheel 62 mechanical transmission (for the purposes of simplification the transmission system of a single transport line 56 has been shown in FIG. 10). Furthermore, the two conveyor belts 57, 58 of each transport line 55, 56 are coupled by means of bevel gears 63.

In addition, the initial section 55a of the transport lines 55 is connected to the principal section of these latter by a transmission of the toothed wheel type 64/synchronous belt 65 type suitable for conferring the same forward speed to the sections.

Figure 11:
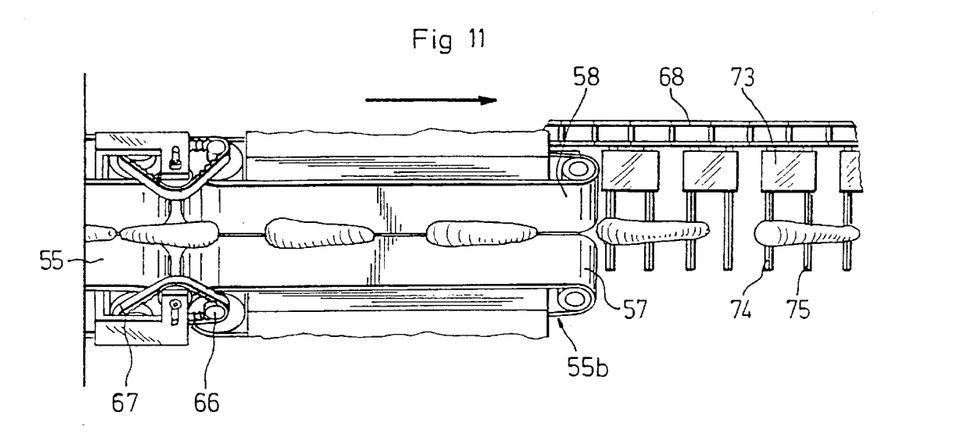
FIG. 11 is a partial top view of a transport line of this transfer machinery at the point where it joins the grading device.
Figure 12:
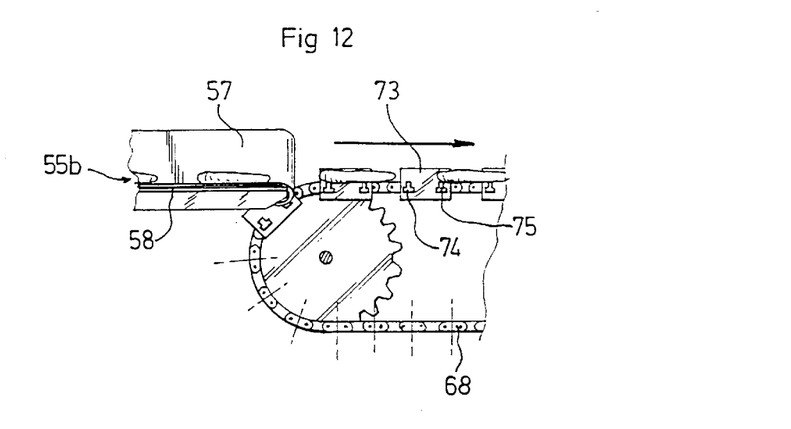
FIG. 12 is a longitudinal section representing the connection between the transfer machinery and the grading device.

The transfer machinery comprises, finally, for each transport line 55, 56 a terminal section such as 55b linking with the grading device/ connected to the principal section of the transport lines 55, 56 by a reduction transmission of the pulley 66/tension 67 type suitable for conferring to the terminal section a forward speed greater than that of the principal section and equal to that of the grading device 12.

As represented in FIG. 11, such a terminal section 55b makes it possible to accelerate the displacement of the produce, thus causing a more marked separation of these latter which facilitates their optical analysis.

Finally, the grading device 12 comprises a conveyor also comprising twelve transport lines driven synchronously, each arranged as an extension of a transport line 55, 56 of the transfer machinery.

Figure 13:
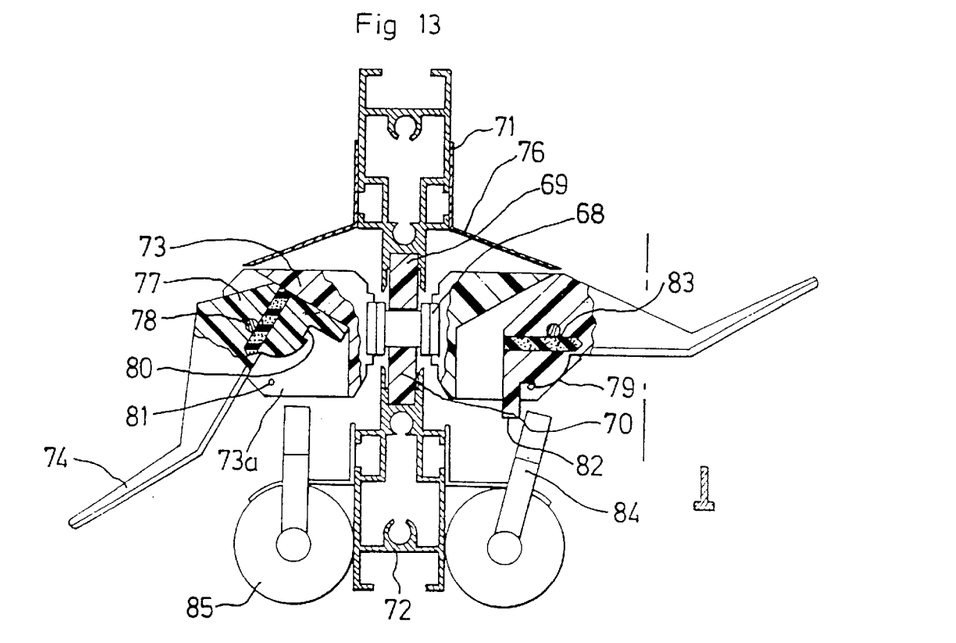
FIG. 13 is a scaled-up transverse section representing, on the one hand, the conveyor pins of the grading device arranged in a tilted position for one of the pins and in a locked position for the other pin and, on the other hand, the triggering machinery for these conveyor pins.

This conveyor comprises six endless chains such as 68 driven synchonously, each arranged to run between two friction pads 69, 70 accommodated in facing grooves arranged in two profiles, upper 71 and lower 72. As represented in FIG. 13, each of these chains 68 bears two series of supports such as 73 arranged on opposite sides of the chain on each of which are attached two transverse conveyor pins such as 74, 75 equipped with a locking mechanism capable of maintaining them in a conveyance position in which each item of produce is borne by a given number of pins depending on the length of the produce. Furthermore, the upper profile 72 includes a cap 76 arranged to make a tangent with the upper face of the supports 73 so as to prevent these latter from tilting transversally with respect to the profile.

In the first instance, each conveyor pin 74, 75 has a concave longitudinal shape and an inverted T-shaped cross-section. Such a cross-section combined with the mode of distribution of the conveyor pins 74, 75 enables the surface of the produce to be masked as little as possible so as to provide an optimal view of the produce.

Furthermore, each of these conveyor pins is extended on the support 73 side by a body 77 arranged to be accommodated in a transversal groove 73a arranged in the support.

This body 77 contains in the first instance an oblong aperture with a vertical main axis accommodating an articulation axis 78 integral to the support 73 suitable for giving rise to a clearance of the conveyor pins 74, 75 in a vertical direction. Furthermore, this body 77 includes transversally a quadrant-shaped lower frontal face 79 at the bottom of which is provided a lower slot 80 suitable for accommodating, in the convoyer position, a spur 81 forming an integral part of the support 73.

The body 77 of the conveyor pins 74, 75 includes moreover an ejector lug 82 projecting downwards from the said body and arranged opposite to the lower face 79 with respect to the slot 80.

Each body 77 of the conveyor pins 74, 75 includes finally a buffer 83 made of a compressible material accommodated in a transverse aperture arranged to emerge in the lower part of the oblong hole and adapted to serve as elastic means able to keep locked the conveyor pins and to prevent an accidental unlocking not due to mechanical causes.

The grading device 12 also comprises triggering machinery arranged plumb with the belts 14,15 for the removal of the produce adapted to cause the selective tilting of a given number of conveyor pins 74, 75 for the purpose of unloading the produce borne by these latter onto the removal belts.

This triggering mechanism comprises a raised cam 84 borne by an electromagnet 85 suitable for causing it to rotate around a longitudinal axis between two positions:

an active position (shown at the left of FIG. 13) where this cam 84 is located on the trajectory of the lugs 82 of the conveyor pins 74, 75 and which, due to its profile, causes an upward displacement of the lugs and an initial tilting of the pins, and a passive position where this cam 84 allows the lugs 82 to pass.

Figure 14:
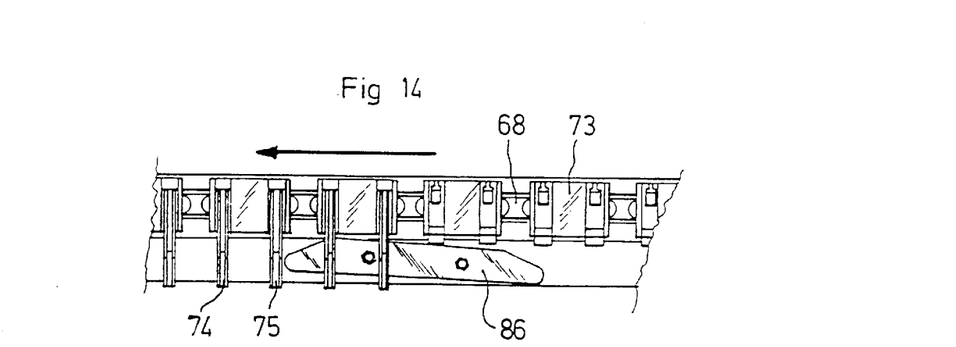
FIG. 14 is a partial longitudinal section of the grading device representing machinery for final triggering suitable for tilting all of the conveyor pins.

The grading device 12 includes, moreover, final triggering machinery adapted to cause the tilting of all of the conveyor pins 74,75 at right angles to the removal belt 22. As shown in FIG. 14, this triggering mechanism comprises a ramp 86 arranged to be located on the trajectory of the lugs 82 of the conveyor pins 74, 75 and raised to initiate the tilting of these latter.

Figure 15:
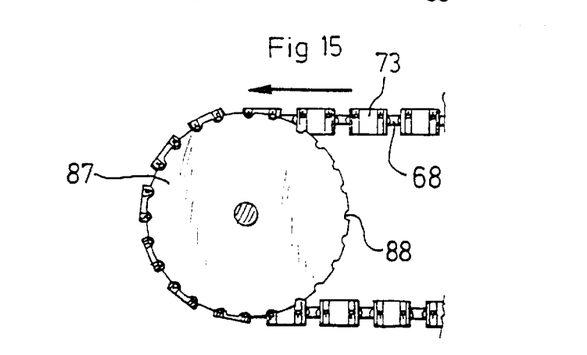
FIG. 15 is a partial longitudinal section of the grading device representing a supporting device for the retriggering of the conveyor pins.

The grading device 12 finally includes a supporting device 87 placed downstream from the ramp 86 able to cause a tilting of the conveyor pins 74, 75 towards their locked conveyor position. As shown in FIG. 15, this supporting device consists of a disk 87 borne by the rotation shaft of the chains 68, equipped with an edge comprising slots 88 each suitable for accommodating a conveyor pin 74,75 and for causing this latter to tilt upwards.

Although these latter are not described the sorting unit also comprises in a standard manner all of the control and automation devices making it possible to synchronize the various conveyors and to index the position of the produce on the grading device 12 in order to control the triggering of the conveyor pins 74, 75 plumb with the adequate removal belts 14, 15.

I claim:

1. Feeding device for a unit for sorting elongate items of produce, and for arranging a shipment of said produce delivered in bulk in parallel rows in each of which the items of produce are aligned one after the other, the feeding device comprising:

an upwardly inclined first conveyor extending at a constant inclination having a plurality of freely rotatable transverse rollers; each roller being mounted around a transverse axis borne near its ends by two endless chains extending in said constant inclination and driven synchronously; said rollers being spaced so that two successive rollers define therebetween a receptacle for an item of produce;

said conveyor comprising longitudinally starting from its low end at which the produce is fed in:

a first longitudinal lower section including means for rotating the rollers around their axis in the same direction as the forward direction of the conveyor;

a second longitudinal intermediate section along the length of which the rollers are freely rotatable; and a third longitudinal upper section including machinery for rotating the rollers around their axis in a direction opposite to the forward direction of the conveyor.

2. Feeding device according to claim 1, wherein the conveyor extends upwards and is inclined at an angle ranging approximately between fifteen and twenty-five degrees.

3. Feeding device according to claim 1, wherein the intermediate section of the conveyor includes a friction wheel positioned so as to make tangential contact with a lower generator for the rollers; said friction wheel adapted to rotate by the machinery for rotating the rollers in the upper section.

4. Feeding device according to claim 1, wherein each roller further comprises near one of its ends at least one toothed wheel; the machinery for rotating the rollers comprising a fixed chain at right angles to the lower section, and at right angles to the upper section a longitudinal endless chain driven at a rate appreciably higher than that of the conveyor; said chains extending at a slope identical with that of the conveyor and being arranged to mesh with the toothed wheels of the rollers.

5. Feeding device according to claim 4, wherein each chain drive for the rotation of the wheels possesses an initial lower section extending at a slope with an inclination substantially higher than that of the conveyor.

6. Feeding device according to claim 4, comprising lateral guidance elements for the toothed wheels for maintaining the wheels along a rectilinear path.

7. Feeding device according to claim 6, wherein each roller further comprises two separated toothed wheels, the lateral guidance elements being arranged to project longitudinally into the space defined by the toothed wheels.

8. Sorting unit for elongate produce which comprises:
a feeding device according to claim 1;
a first distribution device for the produce comprising a conveyor means possessing a loading zone vertically aligned with the upper end of the feeding device and a distribution zone projecting horizontally, said conveyor means comprising:
a number of inclined transverse flaps each able to swivel around a transverse swivel axis borne near its ends by two longitudinal endless chains driven synchronously; said flaps being arranged so that two successive flaps define therebetween a receptacle having a width varying as a function of the respective inclination of the flaps;

means for tilting the flaps to arrange them in a first mode at an inclination defining a minimal width at right angles to the loading zone and to receive all of the produce delivered by the feeding device, and to confer on said flaps in a second mode an inclination suitable to unload the produce borne by said flaps at right angles to an unloading zone; and a grading device equipped with means for optical analysis and with a number of parallel transport lines comprising transfer machinery equipped with an initial loading section for the produce vertically aligned with an unloading zone of the distribution device.

9. Sorting unit according to claim 8, wherein the distribution device further comprises a brush roller interposed between the loading zone of the distribution device and the upper end of the feeding device, said brush roller structured and arranged to rotate synchronously with the endless chains driving the flaps in a direction of rotation opposite to the forward direction of the chains.

10. Sorting unit according to claim 8, wherein the flaps of the distribution device have transversally a V-shaped opening in the direction of the swivel axis, closed off at its base by a hollow tube having its axis on the swivel axis, and a diameter greater than the length of said base.

11. Sorting unit according to claim 8, wherein each flap of the distribution device is equipped, at right angles to at least one of its ends with a castor having a horizontal axis of rotation parallel to the swivel axis of said flaps; and the means for tilting comprises at least one horizontal longitudinal track arranged to constitute a rolling surface for the castors, each of the tracks being provided with at least one interruption of the rolling surface at right angles to an unloading zone.

12. Sorting unit according to claim 8, wherein the transfer machinery for the produce comprises for each line of transport two parallel conveyor belts driven synchronously, arranged relative to each other so as to define transversally a V-shaped channel for accommodating and transporting a row of produce.

13. Sorting unit according to claim 12, wherein the transfer machinery is divided longitudinally into two sections one aligned as an extension of the other: a first section incorporating the initial loading section having two conveyor belts driven synchronously at a speed less than that of the grading device, and a terminal section where the conveyor belts are driven with a speed equal to that of the grading device.

14. Sorting unit according to claim 8, wherein the means for tilting the flaps of the distribution device are adapted to cause successively:

an initial tilting suitable for separating the flaps by a predetermined distance for removing produce having transverse dimensions smaller than a given lower grading value;

at least one additional tilting suitable for unloading produce of transverse dimensions ranging between the given upper and lower grading values; and a final additional tilting suitable for removing all of the produce not unloaded along the length of the conveyor means of the distribution device.

15. Sorting unit according to claim 14, which comprises:

a said first feeding device;

a first distribution device for removing produce of dimensions smaller than the lower grading value and greater than the upper grading value, respectively, and for unloading alternatively a number of rows of produce at right angles to two successive unloading zones;

two parallel secondary feeding and distribution assemblies projecting at right angles to the first distribution device, each arranged to be fed with produce delivered at right angles to one of the unloading zones of the first distribution device;

each of the said assemblies comprising successively a said feeding device, and a distribution device;

the distribution device of one of the said assemblies having an unloading zone suitable for unloading simultaneously a number n of rows of produce vertically aligned with n lines of transport of the transfer machinery of the grading device; and the distribution device of the other assembly, being longer than the first assembly and having an unloading zone suitable for unloading a number m of rows of produce vertically aligned with m lines of transport of the transfer machinery of the grading device parallel to the n lines of transport.

16. Sorting unit according to claim 15, wherein each secondary feeding and distribution assembly comprises a conveyor belt for bringing the produce delivered in bulk towards the feeding devices of the assemblies, each conveyor belt being equipped with an initial loading section vertically aligned with one of the unloading zones of the first distribution device; and a grid conveyor interposed between the conveyor belt and the associated feeding device, for removing pieces of produce.

17. Sorting unit according to claim 8, wherein the grading device includes a conveyor comprising:

a plurality of transverse and parallel conveyor pins attached to supports borne by longitudinal endless chains arranged so that one longitudinal series of conveyor pins projects in a prolongation of each line of transport of the transfer machinery, said pins being equipped with a locking mechanism for maintaining them in a conveyor position in which an item of produce is borne by a given number of successive pins; and triggering machinery operatively associated with the locking mechanism for causing the selective tilting of a given number of pins in order to unload an item of produce borne by said given number of pins in unloading zones.

18. Sorting unit according to claim 17, wherein each endless chain of the grading device bears two facing series of supports placed on either side of the endless chain.

19. Sorting unit according to claim 17, wherein each conveyor pin has a concave longitudinal shape and a cross-section in the form of an inverted T.

20. Sorting unit according to claim 17, wherein each support is adapted to bear two conveyor pins.

21. Sorting unit according to claim 17, wherein:

each conveyor pin is extended by a body containing an oblong-shaped aperture having a main vertical axis and housing an axis of articulation integral with the support, suitable for providing a clearance of said pin in a vertical direction, said body comprising transversally a convex frontal lower face having a lower slot suitable for accommodating in the conveyor position a spur forming an integral part of the support and an ejection lug extending said body downwards and situated opposite the convex frontal lower face with respect to the slot; and the triggering machinery comprises a cam associated with a swivelling mechanism suitable for causing the cam to tilt around a longitudinal axis between an active position in which it is on the trajectory of the lugs of the conveyor pins and causes an upward displacement of said lugs and an initial tilting of said pins, and a passive position in which said cam allows the lugs to pass.

22. Sorting unit according to claim 21, wherein each conveyor pin includes compressible buffer means housed in the oblong aperture for maintaining the conveyor pins locked.

23. Sorting unit according to claim 17, wherein the grading device comprises a final triggering mechanism adapted to cause the tilting of all of the conveyor pins at right angles to an unloading zone situated near a posterior end of the conveyor.

24. Sorting unit according to claim 23, wherein the grading device comprises support means placed downstream of the final triggering mechanism suitable for causing the tilting of the conveyor pins towards their locked conveyor position.

* * * * *